United States Patent
Zanetti et al.

(10) Patent No.: US 9,423,288 B2
(45) Date of Patent: Aug. 23, 2016

(54) METHOD FOR DETERMINING A FLUID LEVEL IN AN INTERNAL COMBUSTION ENGINE FLUID TANK

(75) Inventors: Igor Zanetti, Verrayes (IT); Giovanni David, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1009 days.

(21) Appl. No.: 13/533,530

(22) Filed: Jun. 26, 2012

(65) Prior Publication Data

US 2013/0006548 A1 Jan. 3, 2013

(30) Foreign Application Priority Data

Jun. 28, 2011 (GB) .................................. 1110996.4

(51) Int. Cl.
 G01F 23/00 (2006.01)
 G01F 23/74 (2006.01)

(52) U.S. Cl.
 CPC ........................................ G01F 23/74 (2013.01)

(58) Field of Classification Search
 CPC ................. G01F 23/30; G01F 23/64; G01F 23/72–23/74; G01K 3/08; G01K 13/00; G01K 2205/00; F01N 11/00
 See application file for complete search history.

(56) References Cited

U.S. PATENT DOCUMENTS

| 4,611,287 A | 9/1986 | Kobayashi et al. |
| 4,768,377 A | 9/1988 | Habelmann et al. |
| 5,357,300 A | 10/1994 | Yanagi et al. |
| 7,523,661 B2 * | 4/2009 | Dwyer .................. G01F 23/247 73/295 |
| 2008/0016960 A1* | 1/2008 | Zimmermann ......... G01F 23/22 73/295 |
| 2008/0020493 A1* | 1/2008 | Jin et al. ............................ 438/5 |

FOREIGN PATENT DOCUMENTS

JP 61062822 A 3/1986

* cited by examiner

*Primary Examiner* — Mischita Henson
(74) *Attorney, Agent, or Firm* — Ingrassia Fisher & Lorenz PC

(57) ABSTRACT

A method for determining a fluid level value in a fluid tank of an internal combustion engine equipped with a discrete level sensor is provided. The discrete level sensor is configured for generating a first electrical signal when a fluid level is above or equal to a first predetermined fluid level threshold value and generating a second electrical signal when the fluid level is above or equal to a second predetermined fluid level threshold value. The second predetermined fluid level threshold value is greater than the first predetermined fluid level threshold value. The method includes monitoring a number of occurrences of the first electrical signal and of the second electrical signal over a time interval. The fluid level in the fluid tank is calculated as a function of the number of occurrences of the first and of the second electrical signals over the time interval.

6 Claims, 2 Drawing Sheets

METHOD FOR DETERMINING A FLUID LEVEL IN AN INTERNAL COMBUSTION ENGINE FLUID TANK

CROSS-REFERENCE TO RELATED APPLICATION

This application claims priority to British Patent Application No. 1110996.4, filed Jun. 28, 2011, which is incorporated herein by reference in its entirety.

TECHNICAL FIELD

The technical field relates to an internal combustion engine, particularly an internal combustion engine of a motor vehicle, equipped with a fluid tank and a discrete level sensor.

BACKGROUND

Internal combustion engines are conventionally equipped with a variety of fluid tanks, for example a fuel tank or an urea tank containing urea solution used in the exhaust gas treatment system, for which it is desirable to monitor to some degree the level of the fluid within. Continuous fluid level sensors have widely been used for detecting the level of fluid in a tank. They work by continuously measuring a level within a specified range and determining the exact amount of fluid in the tank as a function of the measured level. Unfortunately these sensors are relatively expensive. As alternative to continuous sensors, discrete level sensors could also be used. Discrete level sensors provide information on the level of fluid in the tank by simply indicating whether the fluid in the tank is above or below predetermined level threshold values. Discrete level sensors are therefore less precise since they are unable to detect the precise level of fluid between two level threshold values. Also when used in internal combustion engines they present additional problems. During transitory driving states of the vehicle, i.e., for example, during acceleration or deceleration, discrete level sensors provide level indications which are often misleading. In those situations the fluid in the tank is sloshed around and the level threshold values are randomly exceeded so that the sensor provides conflicting information regarding the actual level of the fluid in the tank. This is even truer when the discrete level sensors are used, for example, to detect the level of urea in urea tanks. Such tanks normally have a relatively flat and wide parallelepiped shape and small movements of the vehicle are enough to cause the fluid to slosh in the tank and to randomly exceed or fall below various threshold level values.

In view of the above, it is at least one object of an embodiment herein to provide a method to determine in a substantially precise way the fluid level in a fluid tank equipped with a discrete level sensor.

Another object of an embodiment herein is to provide a method for determining a fluid level which is substantially reliable even in transitory driving conditions.

Another object of an embodiment herein is to achieve the above mentioned objects in a simple, rational and inexpensive way without using complex devices and by taking advantage of the computational capabilities of an Electronic Control Unit (ECU) of the vehicle.

These objects are achieved by a method, by an engine, by a computer program and computer program product, by an electromagnetic signal, and by an automotive system having the features recited in the independent claims. In addition, other objects, desirable features and characteristics will become apparent from the subsequent summary and detailed description, and the appended claims, taken in conjunction with the accompanying drawings and this background.

SUMMARY

In greater details, an embodiment herein discloses a method for determining a fluid level value in a fluid tank of an internal combustion engine equipped with a discrete level sensor, wherein the discrete level sensor is configured for:
generating a first electrical signal when a fluid level is above or equal to a first predetermined fluid level threshold value (LT1),
generating at least a second electrical signal when the fluid level is above or equal to a second predetermined fluid level threshold value (LT2), the second predetermined fluid level threshold value (LT2) being greater than the first predetermined fluid level threshold value (LT1), and
wherein the method comprises the steps of:
monitoring a number of occurrences of the first and of the second electrical signal over a time interval; and
calculating the fluid level in the fluid tank (500) as a function of the monitored number of occurrences of the first electrical signal and of the monitored number of occurrences of the second electrical signal over the time interval.

In this way, the level of fluid in a tank equipped with a discrete level sensor can be precisely calculated as a function of the signals generated by the sensor, and a reliable and precise information on the fluid level in the fluid tank can be obtained even in transitory conditions of the vehicle.

According to an embodiment, the fluid level in the fluid tank is calculated as a weighted average of the predetermined fluid level threshold values, each threshold value being weighted by the number of occurrences of the corresponding electrical signal.

In this way it is possible to determine the fluid level by using a simple calculation which can be easily implemented using the capabilities already present in the ECU of an internal combustion engine.

According to another embodiment, a fluid level threshold value is disregarded in the calculation of the fluid level if the corresponding monitored number of occurrences is below a predetermined occurrence threshold value The methods of the various embodiments can be carried out with the help of a computer program comprising a program-code for carrying out all the steps of the methods described above, and in the form of a computer program product comprising the computer program.

The computer program product can be embodied as an internal combustion engine provided with a discrete level sensor and a ECU in communication with the discrete level sensor, a memory system associated with the ECU, and the computer program stored in the memory system, so that, when the ECU executes the computer program, all the steps of the method described above are carried out.

The method can be also embodied as an electromagnetic signal, the signal being modulated to carry a sequence of data bits which represent a computer program to carry out all steps of the method.

An embodiment further provides a control apparatus for an internal combustion engine equipped with a fluid tank and a discrete level sensor, the control apparatus comprising an Electronic Control Unit in communication with the discrete level sensor, a memory system associated with the Electronic Control Unit and a computer program stored in the memory system.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
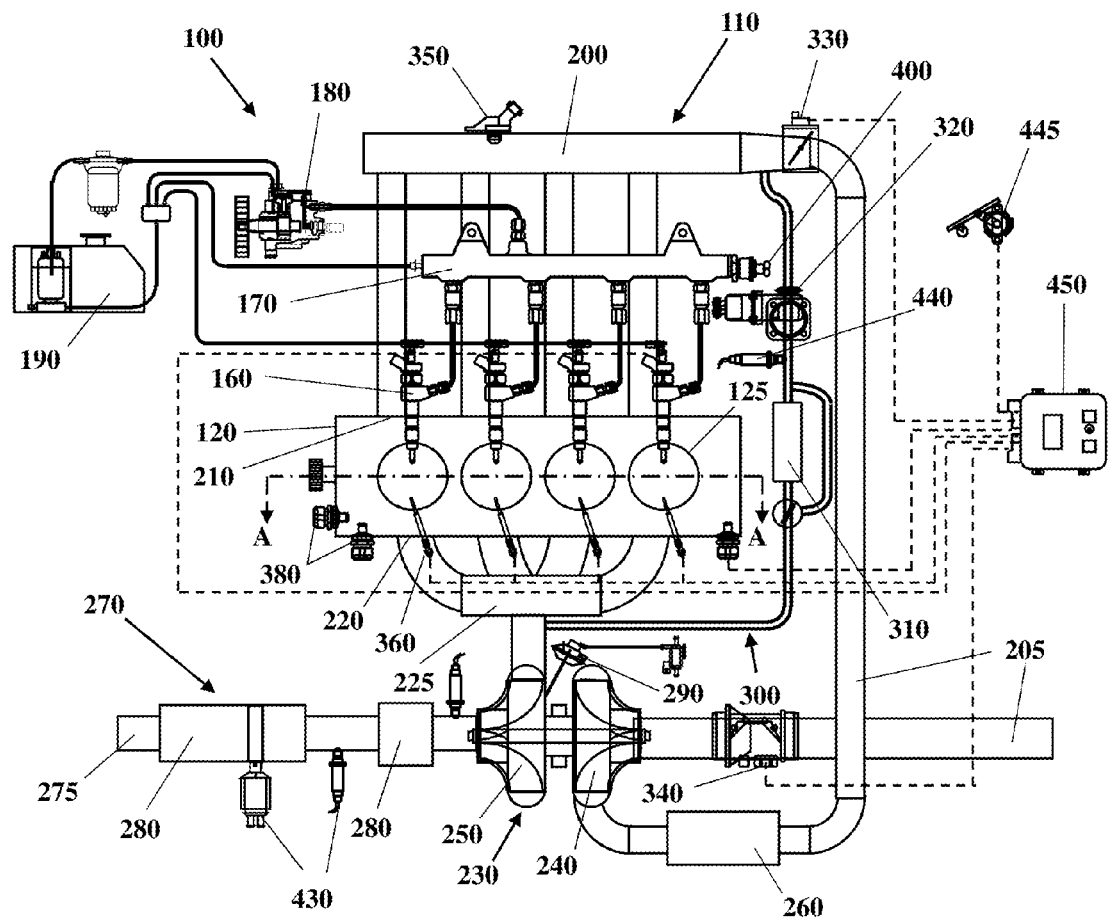
FIGS. 1 and 2 are schematic representations of an automotive system comprising an internal combustion engine.
Figure 2:
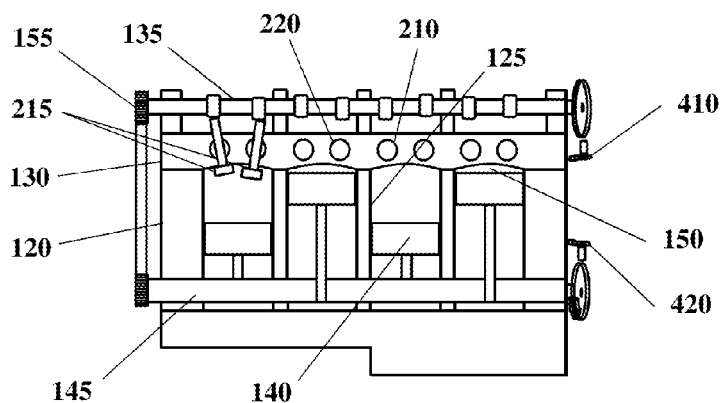

Various embodiments contemplated herein may include an automotive system 100, as shown in FIGS. 1 and 2, that includes an internal combustion engine (ICE) 110 having an engine block 120 defining one or more cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by a fuel injector 160 and the air through an intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be of fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx Traps, hydrocarbon adsorbers, selective catalytic reduction (SCR) systems, and diesel particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440 and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

A fluid tank in the internal combustion engine, such as the fuel source 190 or an urea solution tank associated to the SCR 280, can be equipped with discrete level sensors. The fluid level in the tank is generally sensed by obtaining a discrete indication, such as an electrical signal, whenever a predetermined threshold value has been reached, for example whenever the quantity of fluid in the tank exceeds a predetermined quantity. Fluid level sensors make use of various kinds of float operated mechanisms, resistance mechanisms, capacitative mechanisms, and acoustic mechanisms. A commonly used fluid level sensor is a magnetic float sensor which is very popular because of its simplicity, dependability and low cost. An example of a magnetic float discrete level sensor will now be described in more details with reference to FIG. 3 which is a schematic representation of a fluid tank 500, in the present example, the urea solution tank, equipped with such a sensor 510. The sensor 510 comprises a magnetic float 513, annularly shaped, movably supported on an exterior of a tube 511. The float 513 is adapted to be buoyant in the fluid and to move upwards and downwards along the tube with changing the fluid level in the tank 500. A stop element 514 is located at the top of the tube 511 to stop the magnetic float 513 from being detached from the sensor 510.

Figure 3:
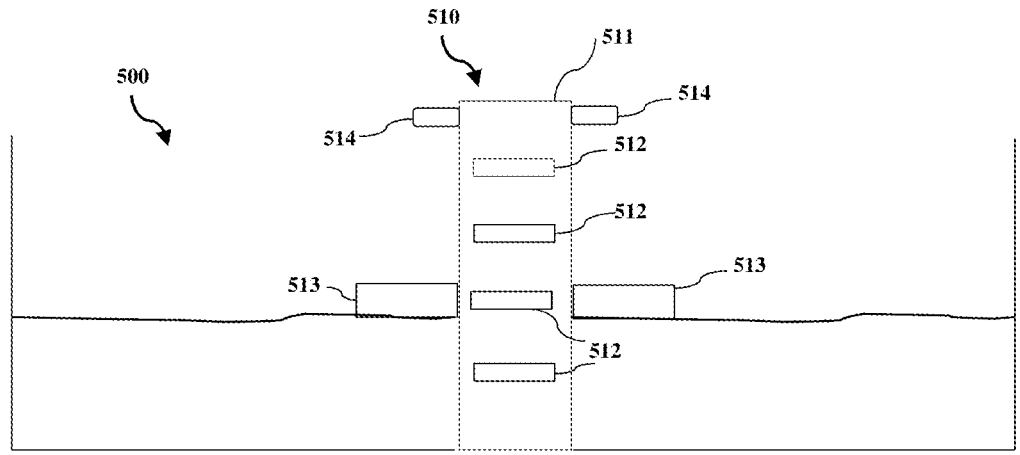
FIG. 3 is a schematic representation of a fluid tank equipped with a discrete level sensor.

The sensor 510 further comprises a switch assembly 512 supported inside the tube 511. The switch assembly 512 comprises a plurality of switches, each located at a different position along the tube 511, each adapted to be magnetically activated when the magnetic float 513, moving along the length of the tube 511, reaches its level position. Each switch therefore corresponds to a fluid level threshold value in the tank. In FIG. 3 four fluid level threshold values are represented but the sensors can comprise from 2 to a plurality of switches and corresponding threshold level values.

The switch assembly 512 also comprises a plurality of resistors, each resistor in parallel to a switch. Whenever a switch is actuated the corresponding resistor is bypassed. A constant voltage, for example 5V, is applied to the switch assembly 512 via a constant voltage generator (not shown). The switch assembly 512 is then connected to the ECU 450 which is configured to receive an electrical signal from the sensor 510, for example a percentage of the voltage value applied to the sensor 510, which is a function of the number of bypassed resistors i.e., of the number of actuated switches.

When the fluid in the tank reaches a certain quantity corresponding to a level threshold value, the magnetic float 513 actuates the corresponding switch and a corresponding electrical signal is generated and sent to the ECU 450. If the fluid in the fluid tank 500 is calm the magnetic float 513 is also stable along the tube 511 and the signal received by the ECU 450 is constantly the same until the level of fluid changes.

Figure 4:
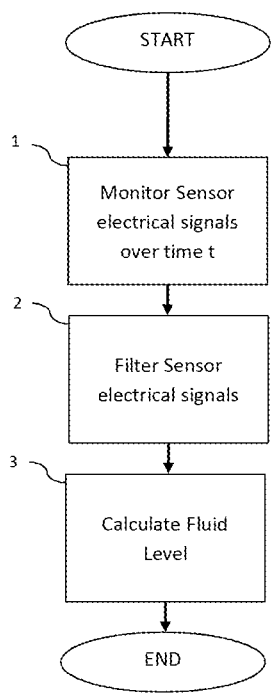
FIG. 4 is a schematic representation of the method according to an embodiment contemplated herein.

In normal operation, when the vehicle is moving, the fluid in the tank also moves around. It can be observed that in those circumstances the electrical signal produced by the sensor in a time interval, for example in the range of about 20 seconds, is not constant. The ECU 450 will actually receive a combination of electrical signals each corresponding to a level threshold value. The different electrical signals could be represented by the same signal with a different value of a characterizing parameter, i.e. frequency or amplitude. The method according to an embodiment will now be described with reference to FIG. 4.

In particular, the actual fluid level in the fluid tank 500 can be determined by the ECU 450 by monitoring the occurrences of each electrical signal in that time interval (block 1). The time interval can be determined in a preliminary calibration phase and it can correspond to the time needed to fill in a dedicated buffer (not shown) in the memory system 451.

A preliminary selection can be carried on the monitored occurrences on each electrical signal (block 2). In particular before calculating the fluid level the threshold values having a number of occurrences below a predetermined number of occurrences threshold value can be discarded. The number of occurrences threshold value, generally very small, can be determined in a calibration phase. This additional filtering step allows discarding samples only occurring sporadically in the time interval. In his way spikes due to sloshing of the fluid are detected and discarded.

The fluid level in the tank is then calculated (block 3) as the weighted average of the threshold level values, each weighted by the number of occurrences of the corresponding electrical signal. In particular:

$$L = \frac{Th_1 * n_1 + Th_2 * n_2 + \ldots + Th_1 * n_z}{n_1 + n_2 + \ldots + n_z}$$

wherein L represents the calculated fluid level, This represents the threshold level values from i to z, and ni represents the corresponding number of occurrences.

In case of transitory driving conditions causing sloshing of the fluid in the fluid tank 500 the signal provided by the sensor 510 can change very quickly. This occurs for example when the sensor 510 is located in a fluid tank 500 of a vehicle which is accelerating or decelerating and the fluid in tank 500 is slammed from side to side. In such circumstances the magnetic float 513 moves along the tube 511 rapidly and the signal generated by the sensor 510 changes rapidly.

Even in those situations the fluid level can be calculated using the above formula. Furthermore, during the preliminary filtering step (block 2), spikes due to sloshing of the fluid are detected and discarded.

The method described above can be repeated once the time interval elapses, or the corresponding buffer is full, so as to continuously provide information on the fluid level.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for controlling an internal combustion engine associated with a fluid tank equipped with a discrete level sensor in the fluid tank and an electronic control unit having a processor, and the processor performs the method comprising:

generating a first electrical signal, with the discrete level sensor, when a fluid level is above or equal to a first predetermined fluid level threshold value;

generating a second electrical signal, with the discrete level sensor, when the fluid level is above or equal to a second predetermined fluid level threshold value, the second predetermined fluid level threshold value being greater than the first predetermined fluid level threshold value;

receiving, by the processor, the first electrical signal and the second electrical signal;

monitoring, by the processor, a number of occurrences that each of the first electrical signal and the second electrical signal are generated by the discrete fluid level sensor within the fluid tank during a time interval;

calculating, by the processor, the fluid level in the fluid tank based on the number of occurrences of the first electrical signal during the time interval and the number of occurrences of the second electrical signal during the time interval;

determining, by the processor, the fluid level value based on the calculation; and generating, by the processor, output signals and controlling the internal combustion engine based on the calculated fluid level, wherein the fluid level in the fluid tank is calculated by the processor as a weighted average of the first predetermined fluid level threshold value and the second predetermined fluid level threshold value, each predetermined fluid level threshold value being weighted by the number of occurrences of each of the first electrical signal and the second electrical signal as generated by the discrete fluid level sensor, respectively.

2. The method according to claim 1 wherein at least one of the first predetermined fluid level threshold value and the second predetermined fluid level threshold value is disregarded during the calculating of the fluid level by the processor if the number of occurrences of at least one of the first electrical signal and the second electrical signal, respectively, is below a predetermined threshold value thereof.

3. A computer program product comprising a non-transitory computer usable medium having a computer readable program code embodied therein, the computer readable program code executed by a processor of an electronic control device of an internal combustion engine to implement a method for controlling the internal combustion engine associated with a fluid tank equipped with a discrete level sensor, and the processor performs the method comprising the steps of:

receiving a first electrical signal, generated by the discrete level sensor, when a fluid level is above or equal to a first predetermined fluid level threshold value;

receiving a second electrical signal, generated by the discrete level sensor, when the fluid level is above or equal to a second predetermined fluid level threshold value, the second predetermined fluid level threshold value being greater than the first predetermined fluid level threshold value, monitoring a number of occurrences that each of the first electrical signal and the second electrical signal are generated by the discrete level sensor within the fluid tank during a time interval;

calculating the fluid level in the fluid tank based on the number of occurrences of the first electrical signal during the time interval and the number of occurrences of the second electrical signal during the time interval; and determining the fluid level value based on the calculation, wherein at least one of the first predetermined fluid level threshold value and the second predetermined fluid level threshold value is disregarded during the calculating of the fluid level by the processor if the number of occurrences of at least one of the first electrical signal and the second electrical signal, respectively, is below a predetermined threshold value thereof, and the processor generates output signals and controls the internal combustion engine based on the calculated fluid level.

4. The computer program product according to claim 3 wherein the fluid level in the fluid tank is calculated by the processor as a weighted average of the first predetermined fluid level threshold value and the second predetermined fluid level threshold value, each predetermined fluid level threshold value being weighted by the number of occurrences of each of the first electrical signal and the second electrical signal as generated by the discrete fluid level sensor, respectively.

5. An automotive system comprising:

an internal combustion engine provided with a fluid tank and an electronic control unit having a processor;

a discrete level sensor within the fluid tank that generates a first signal when a fluid level is above or equal to a first predetermined fluid level threshold value and generates a second signal when the fluid level is above or equal to a second predetermined fluid level threshold value, the second predetermined fluid level threshold value being greater than the first predetermined fluid level threshold value;

the processor of the electronic control unit in communication with the discrete level sensor to receive the first signal and the second signal, and the processor:

receives the first signal and the second signal;

monitors a number of occurrences that each of the first signal and the second signal are generated by the discrete fluid level sensor within the fluid tank during a time interval;

calculates the fluid level in the fluid tank based on the number of occurrences of the first signal during the time interval and the number of occurrences of the second signal during the time interval; and determines a fluid level value of the fluid tank based on the calculation, wherein the processor of the electronic control unit calculates the fluid level as a weighted average of the first predetermined fluid level threshold value and the second predetermined fluid level threshold value, each predetermined fluid level threshold value being weighted by the number of occurrences of each of the first signal and the second signal as generated by the discrete fluid level sensor, respectively, and the processor generates output signals and controls the internal combustion engine based on the calculated fluid level.

6. The automotive system according to claim 5 wherein the processor of the electronic control unit disregards at least one of the first predetermined fluid level threshold value and the second predetermined fluid level threshold value during the calculating of the fluid level if at least one of the number of occurrences of the first signal and the second signal, respectively, is below a predetermined threshold value thereof.

* * * * *